(12) United States Patent
Agrawal et al.

(10) Patent No.: US 12,552,141 B2
(45) Date of Patent: Feb. 17, 2026

(54) METHOD OF MANUFACTURING A MAT FOR USE AS A SUPPORT SURFACE

(71) Applicant: Newpark Mats & Integrated Services LLC, The Woodlands, TX (US)

(72) Inventors: Gaurav Agrawal, Katy, TX (US); Dane Manuel, Youngsville, LA (US)

(73) Assignee: NPK ACCESS SOLUTIONS LLC, The Woodlands, TX (US)

( * ) Notice: Subject to any disclaimer, the term of this patent is extended or adjusted under 35 U.S.C. 154(b) by 289 days.

(21) Appl. No.: 18/160,340

(22) Filed: Jan. 27, 2023

(65) Prior Publication Data
US 2024/0253337 A1    Aug. 1, 2024

(51) Int. Cl.
  B29C 39/02   (2006.01)
  B29C 39/00   (2006.01)
  B32B 27/20   (2006.01)
  B32B 27/32   (2006.01)

(52) U.S. Cl.
  CPC ............ *B32B 27/20* (2013.01); *B29C 39/003* (2013.01); *B29C 39/02* (2013.01); *B32B 27/32* (2013.01); *B32B 2250/03* (2013.01); *B32B 2264/067* (2013.01); *B32B 2264/101* (2013.01); *B32B 2264/1021* (2020.08); *B32B 2264/105* (2013.01); *B32B 2305/70* (2013.01); *B32B 2307/744* (2013.01); *B32B 2471/04* (2013.01)

(58) Field of Classification Search
  CPC ..................................................... B29C 39/10
  See application file for complete search history.

(56) References Cited

U.S. PATENT DOCUMENTS

| | | | | |
|---|---|---|---|---|
| 2,793,136 A * | 5/1957 | Root | ...................... | E01F 9/506 |
| | | | | 442/101 |
| 3,097,080 A * | 7/1963 | Weir | ...................... | B29C 70/28 |
| | | | | 428/323 |
| 3,328,231 A * | 6/1967 | Sergovic | .............. | B29C 67/243 |
| | | | | 428/331 |
| 3,344,011 A * | 9/1967 | Goozner | ................. | E04F 15/10 |
| | | | | D25/163 |
| 3,682,741 A * | 8/1972 | Elliott et al. | .............. | B44C 1/00 |
| | | | | 156/298 |
| 3,787,544 A * | 1/1974 | Barnette | ............... | B29C 33/126 |
| | | | | 264/108 |
| 4,353,947 A * | 10/1982 | Northcutt | ................ | B29C 70/34 |
| | | | | 428/116 |
| 4,915,888 A * | 4/1990 | Sato | .................... | B28B 19/0007 |
| | | | | 264/316 |
| 5,330,694 A * | 7/1994 | Iwaya | ..................... | B28B 7/007 |
| | | | | 156/719 |
| 10,286,856 B2 * | 5/2019 | Rijpkema | .............. | B29C 43/52 |

(Continued)

*Primary Examiner* — Edmund H Lee
(74) *Attorney, Agent, or Firm* — CANTOR COLBURN LLP

(57) ABSTRACT

Method of manufacturing mats for use as support surfaces include depositing a resin material in a mold shaped to define a mat, depositing a recycled material on a top surface of the deposited resin material, and at least one of heat treating and pressure treating the resin material and the recycled material to generate a formed mat. The recycled material and the resin material are fused together during the treatment by at least one of the heat treating and the pressure treating to form a friction layer of the formed mat comprising the fused resin material and recycled material.

12 Claims, 6 Drawing Sheets

(56) References Cited

U.S. PATENT DOCUMENTS

| | | | |
|---|---|---|---|
| 12,350,865 B2* | 7/2025 | Josefsson | E04F 15/105 |
| 2007/0218252 A1* | 9/2007 | Donald | B29C 39/025 |
| | | | 428/156 |
| 2015/0299459 A1* | 10/2015 | Kulp | B29B 9/06 |
| | | | 264/141 |
| 2022/0314503 A1* | 10/2022 | Josefsson | E04F 15/107 |

* cited by examiner

METHOD OF MANUFACTURING A MAT FOR USE AS A SUPPORT SURFACE

BACKGROUND

When performing operations with heavy equipment it may be useful to provide a firm, stable, and continuous support surface to support such heavy equipment or otherwise provide for a stable work surface and/or a support surface over which vehicles may be conveyed. Such support surfaces can provide support for the equipment, vehicles, and personnel involved in work processes and may be configured to withstand severe weather and other harsh environmental impacts. The components of the support surface may be capable of being quickly and easily installed and capable of being quickly and easily removed and reused.

Wooden boards or planks have historically been used to construct temporary roadways and equipment support surfaces in remote or undeveloped areas where the terrain lacks sufficient integrity to adequately support trucks and other heavy equipment. Such boards were generally placed end to end, or side by side, to form a continuous load supporting surface. While individual wooden boards or planks have been used to construct support surfaces for some time, this method of building roadways and other load bearing surfaces suffers from some very significant disadvantages.

A variety of mat systems have been developed for the construction of temporary roadways and support surfaces. These mat systems typically utilize prefabricated, multi-layered mats which can be installed in a variety of configurations to create roadways or other support surfaces. These mats, which are constructed of a number of individual boards or planks affixed together in a variety of configurations, generally interconnect or inter mesh with one another to form a continuous, or nearly continuous, support surface. It may be advantageous to have improved mats and systems for providing and creating temporary roadways and/or support surfaces.

BRIEF DESCRIPTION OF THE DRAWINGS

The subject matter is particularly pointed out and distinctly claimed at the conclusion of the specification. The foregoing and other features, and advantages of the present disclosure, are apparent from the following detailed description taken in conjunction with the accompanying drawings in which like elements may be numbered alike and:

DETAILED DESCRIPTION

Characteristics and advantages of the present disclosure and additional features and benefits will be readily apparent to those skilled in the art upon consideration of the following detailed description and accompanying figures. It should be understood that the description herein and associated drawings, being of example embodiments, are not intended to limit the claims of this patent or any patent or patent application claiming priority hereto. On the contrary, the intention is to cover all modifications, equivalents, and/or alternatives as appreciated by those of skill in the art. Many changes may be made to the particular embodiments and details disclosed herein without departing from the scope of the present disclosure.

Figure 1A:
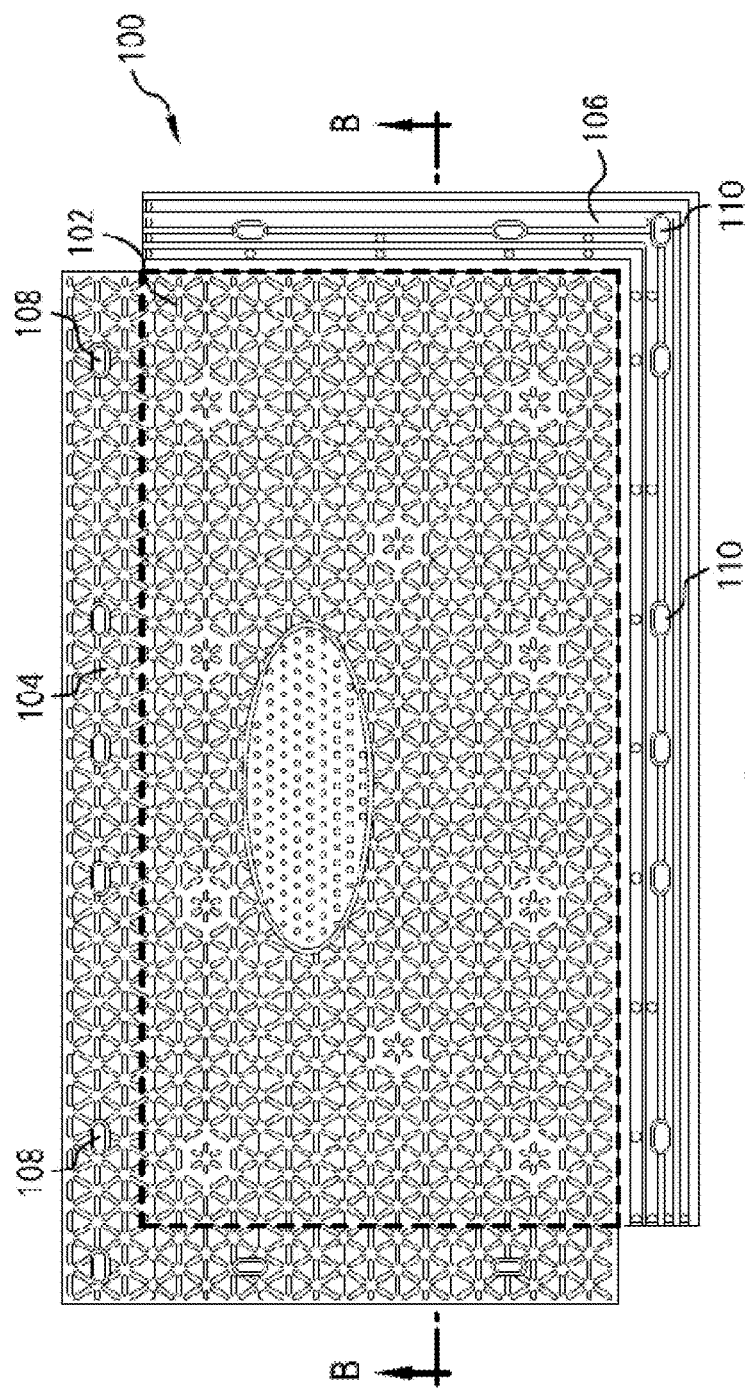
FIG. 1A is a schematic illustration of a mat that may incorporate embodiments of the present disclosure.
Figure 1B:
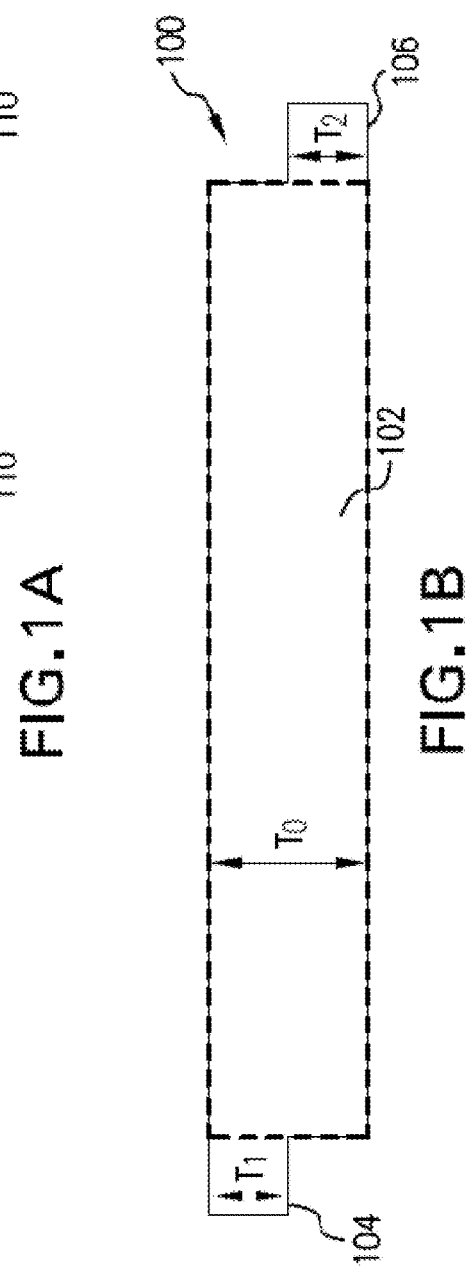
FIG. 1B is a cross-sectional illustration of the mat of FIG. 1A as viewed along the line B-B of FIG. 1A.

Referring to FIGS. 1A-1B, schematic illustrations of a mat 100 that is formed in accordance embodiments of the present disclosure are shown. The mat 100 is configured to be a stand-alone structure or may be joined with one or more additional similar mats to define a support surface of a desired shape and/or size. The mat 100 is configured to provide a work or support surface over which vehicles may traverse, equipment may be installed and operated, etc. FIG. 1A illustrates a top-down plan view illustration of the mat 100 and FIG. 1B is a cross-sectional illustration of the mat 100 as viewed along the line B-B in FIG. 1A. The mat 100 can include a main body 102, a first lip structure 104, and a second lip structure 106. As shown, the main body 102 has a main body thickness $T_0$, and each lip structure 104, 106 has a respective lip structure thickness $T_1$, $T_2$. Because the mat 100 is configured to be joinable with other similar mats, the sum of the lip structure thicknesses $T_1$, $T_2$ can equal the main body thickness $T_0$. In an embodiment, the lip structure thicknesses $T_1$, $T_2$ can each be equal to half the main body thickness $T_0$.

The lip structures 104, 106 each extend outward from the main body 102. In one or more embodiments, each of the lip structures 104, 106 may extend from about half of a perimeter of the main body 102. The lip structures 104, 106 each include, as shown, respective pin apertures 108, 110 that are configured to receive a locking pin (not shown) to join two mats that are arranged adjacent to each other with pin apertures aligned. Such locking pins can be used to ensure a secure and continuous surface defined by the joined mats. That is, if two mats similar to that shown in FIGS. 1A-1B are joined by one or more locking pins installed through aligned pin apertures 108, 110, a first lip structure 104 on one mat 100 may overlap a second lip structure 106 of the adjacent mat, with the joined first and second lip structures of the two mats having a thickness equal to the main body thickness $T_0$.

Although shown and described as distinct components or features, the main body 102, the first lip structure 104, and the second lip structure 106 may be formed of a single continuous material (e.g., a uniform body), from two panels or portions joined together, or from three or more joined panels of portions. As a non-limiting example, the lip structures 104, 106 can be separately attached to, bonded to, or otherwise secured to the main body 102. As another example, the main body 102 can be formed from two panels, each having one of the lip structures 104, 106, and the two panels can be attached, bonded, or otherwise secured together. Accordingly, the illustrative configuration shown and described with respect to FIGS. 1A-1B is not intended to be limiting, but rather is provided for illustrative and explanatory purposes only.

The main body 102 may have a solid or non-solid interior structure, such as voids or cavities defined by ribs or the like. For example, in some embodiments the main body may have an interior support structure configured to provide strength, stability, and/or rigidity to the mat 100. The interior support structure may be a combination of voids and ribs that are encapsulated by exterior surfaces of the main body. Such voids or cavities can permit a reduction in weight as compared to a solid interior structure of the mat 100.

Figure 2:
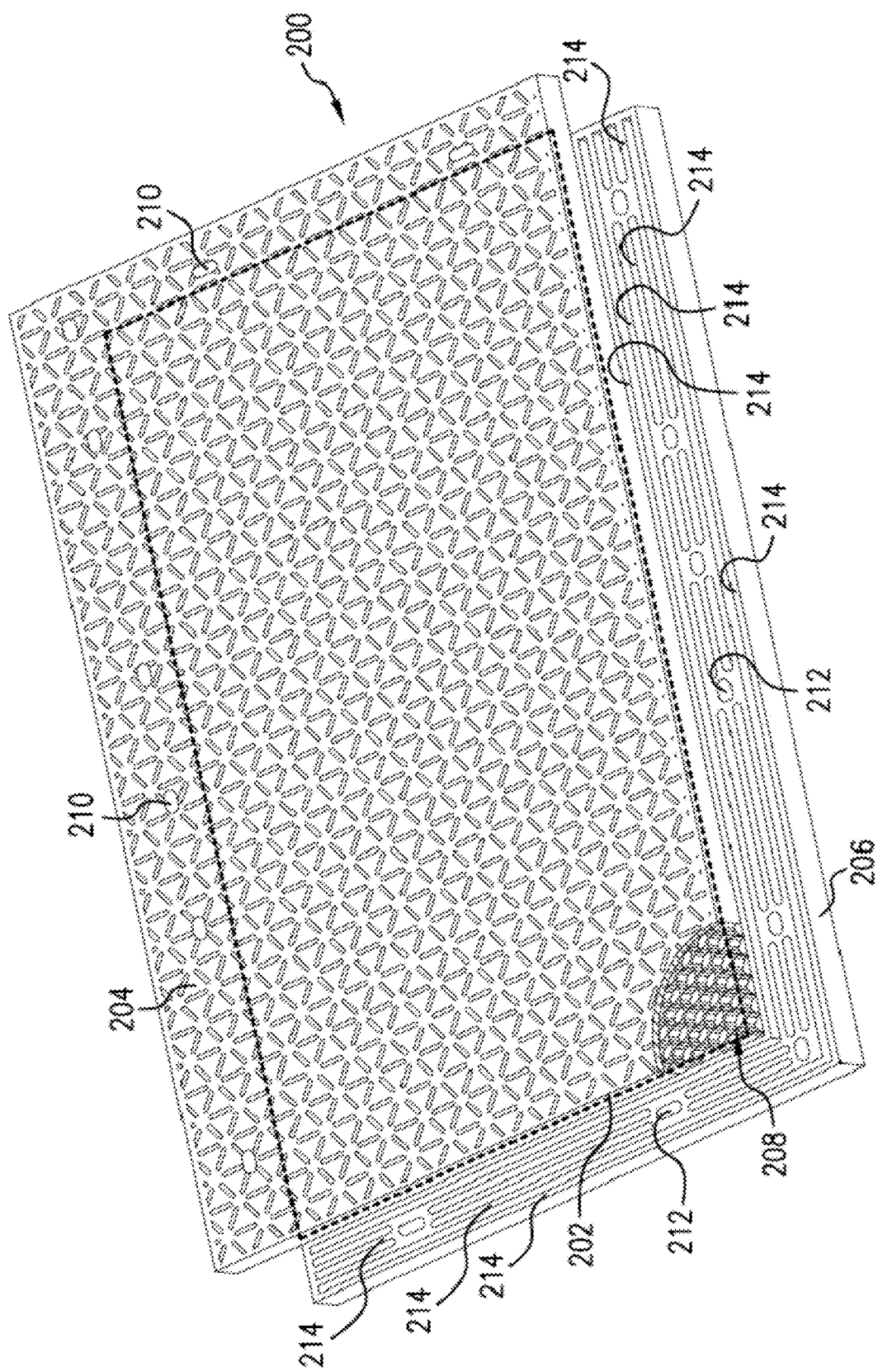
FIG. 2 is a schematic illustration of a mat that may incorporate embodiments of the present disclosure.

Turning now to FIG. 2, a schematic illustration of a mat 200 that may be formed in accordance with embodiments of the present disclosure is shown. The mat 200 may have a similar construction as that shown and described with respect to the mat 100 in FIGS. 1A-1B. The mat 200 may be made from a rigid material capable of withstanding compression forces, such as weights, vehicles, equipment, and/or other loads, positioned on the mat 200. In some non-limiting embodiments, the mat 200 may be constructed of a thermoplastic polymeric material, such as polyethylene or alkathene. In one or more embodiments, the mat 200 can be made of high-density polyethylene, medium-density polyethylene, low-density polyethylene, or mixtures thereof. In accordance with embodiments of the present disclosure, the material used to form the mat 200 may be a combination of recycled and new material, which may provide benefits over mats formed from 100% new material.

The mat 200 includes a main body 202, a first lip structure 204, and a second lip structure 206, with the first and second lip structures 204, 206 extending from the main body 202 as illustrated above. As described above, the first and second lip structures 204, 206 extend or cantilever from portions of the exterior surfaces of the main body 202. The lip structures 204, 206 each include respective pin apertures 210, 212 to enable connection to and joining of two adjacent mats. The lip structures 204, 206 may also include respective rib structures 214 (only shown for the second lip structure 206 in this illustration) which may be aligned (e.g., top to bottom) or misaligned with a similar ribbed structure of an adjacent mat when two mats are arranged adjacent to each other and connected by locking pins.

The main body 202 includes an interior support structure 208. The interior support structure 208 is configured to provide strength to the mat 200, such as crush strength. The interior support structure 208 may be a combination of voids and ribs that are encapsulated by exterior surfaces of the main body 202. Thus, the interior support structure 208 can permit a reduction in weight as compared to a solid body structured mat.

The interior support structure 208 of the main body 202, may be, in some configurations, an interconnected web structure such as in a honeycomb or other geometric pattern, which may be a repeating pattern of the same geometric shape. As noted, the interior support structure 208 defines voids within the main body 202.

For example, in one non-limiting example, the voids of the interior support structure 208 may define at least 30% of the interior volume of the main body 202 (i.e., the main body 202 is 30% internally hollow in this example). The size and shape of the repeating pattern of the interconnected web structure can be changed or modified to change the number of voids in the main body 202. For example, the voids may define at least 45%, at least 50%, at least 60%, at least 70%, and/or other amount of the interior volume of the mat 200 that will be appreciated by those having ordinary skill in the art, depending on the application and use of the mat 200. In configurations where the interior support structure 208 is a geometric repeating pattern, each void of the interior support structure 208 may be between and inclusive of about 2.5 inches (6.35-cm) and about 5 inches (12.7-cm) in the largest dimension thereof.

Mats are conventionally made through a manufacturing process of pouring or otherwise depositing a material (e.g., beads of material) into a mold, and then applying heat and pressure to form the mat from the poured material. One such manufacturing process is described in U.S. Pat. No. 6,649,110, entitled "Method for manufacturing molded panels," which is hereby incorporated by reference in its entirety.

Figure 3B:
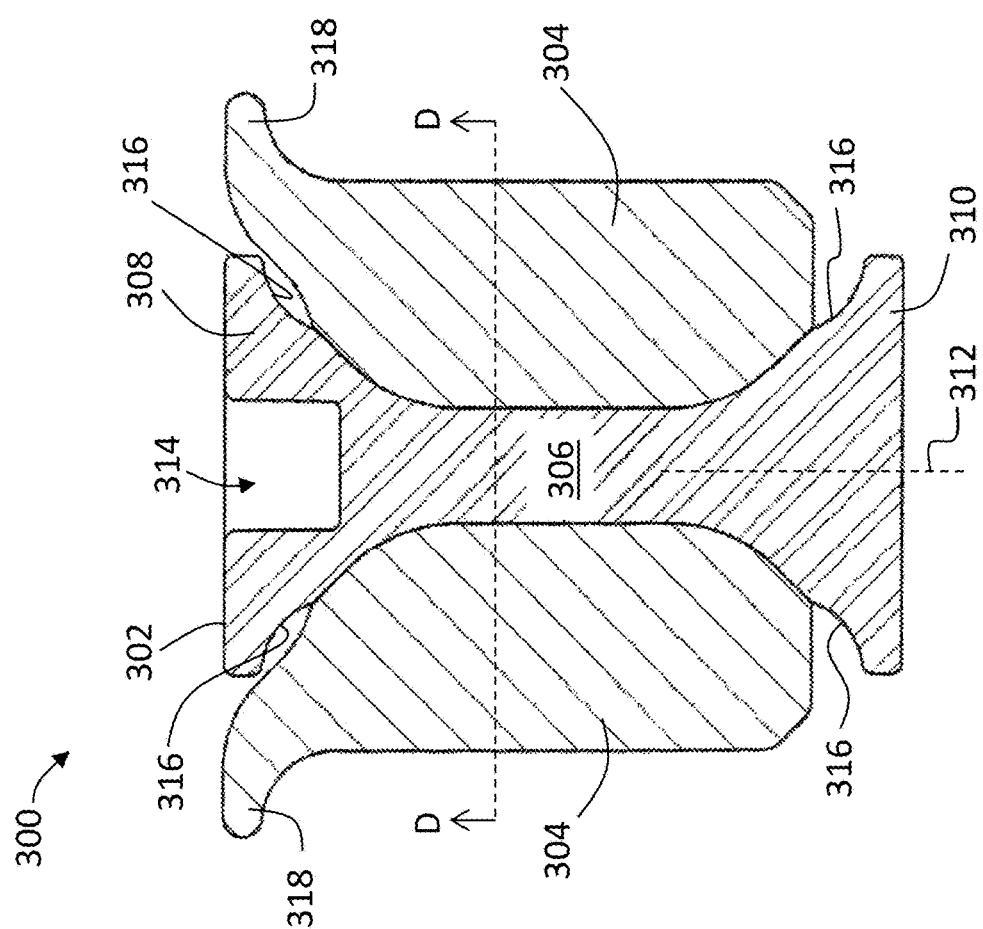
FIG. 3B is a cross-sectional illustration of the locking pin of FIG. 3A.
Figure 3A:
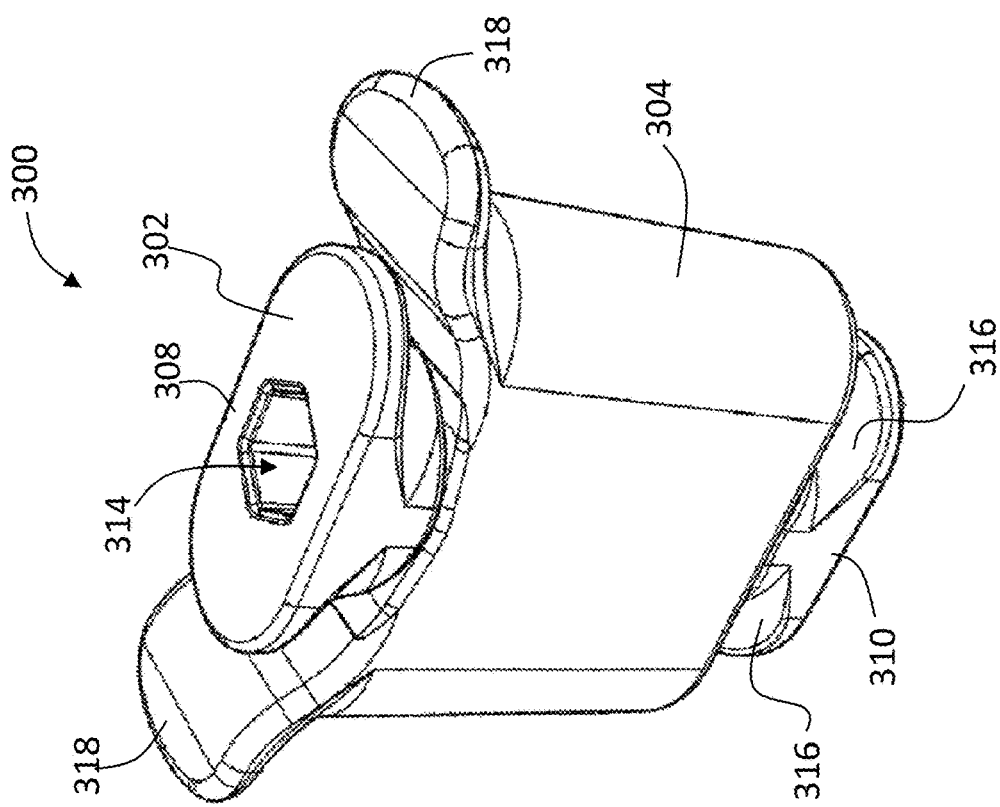
FIG. 3A is a perspective illustration of a locking pin for use with mats in accordance with embodiments of the present disclosure.
Figure 3D:
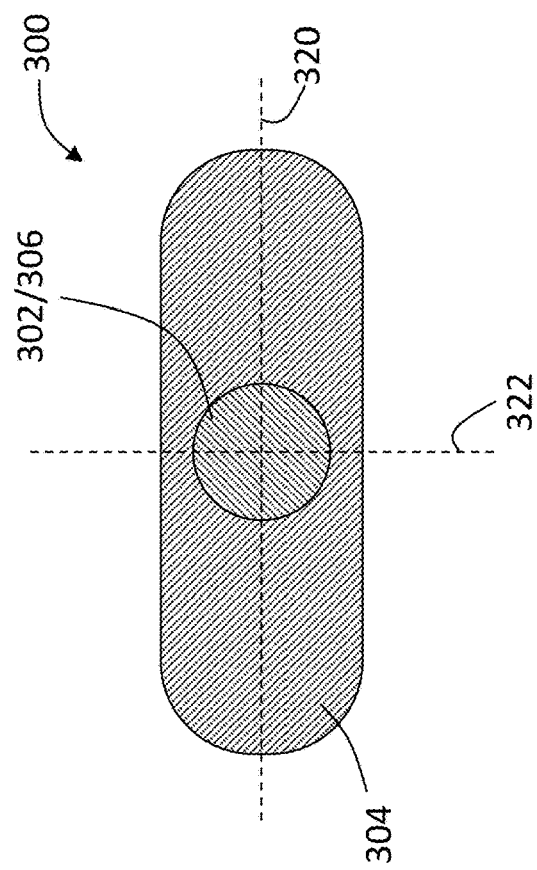
FIG. 3D is a cross-sectional illustration of the locking pin of FIG. 3A as viewed along the line D-D shown in FIG. 3B.
Figure 3C:
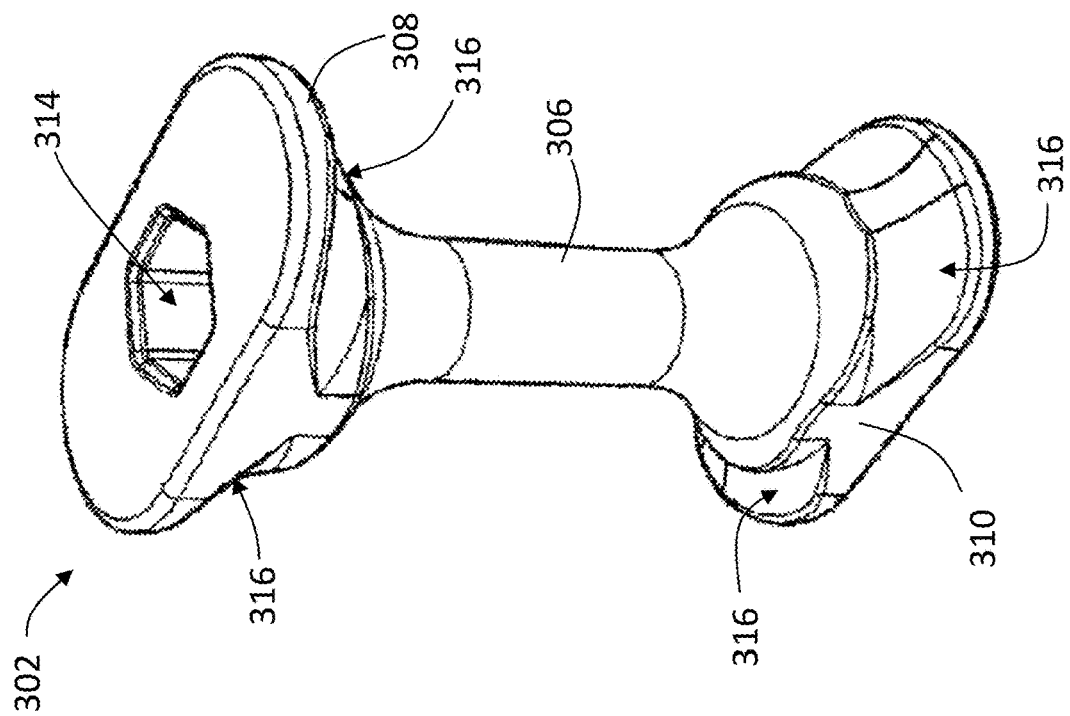
FIG. 3C is a perspective illustration of a rotor of the locking pin of FIG. 3A.

Referring now FIGS. 3A-3D, schematic illustrations of a locking pin 300 of the present disclosure are shown. FIG. 3A is a perspective view of the locking pin 300, FIG. 3B is a cross-sectional view of the locking pin 300, FIG. 3C is a schematic view of a rotor 302 of the locking pin 300, and FIG. 3D is a cross-sectional view of the locking pin 300 as viewed along the line D-D shown in FIG. 3B. The locking pin 300 includes a rotor 302 and a pin body 304. The rotor 302 is a movable component that can secure (e.g., lock/unlock) the pin body 304 to a mat or two overlapping mats.

The rotor 302 comprises a stem 306 joining a rotor head 308 and a rotor foot 310 at opposite ends of stem 306. In accordance with some embodiments, and as shown, the rotor head 308 and the rotor foot 310 may be the same shape and geometry. The rotor head 308 and the rotor foot 310 may be arranged or oriented at right angles to a longitudinal axis 312 of stem 306. The rotor head 308 includes a turning feature 314 to permit a tool (e.g., wrench, screwdriver, Allen wrench, custom tool, etc.) to connect to and turn the rotor 302. For example, and as shown, the turning feature is a multi-sided socket formed in the top surface of the rotor head 308. However, it will be appreciated that other types of turning features may be employed without departing from the scope of the present disclosure. For example, the turning feature 314 may be arranged as a screwdriver slot, a hex or other shaped slot, a depression, a protrusion or other structure extending upward from a surface (either permanent or selectively removable or extendable), etc. In operation, the rotor head 308 and the rotor foot 310, in conjunction with the stem 306, provide structural elements which serve to lock adjoining mats together. The joining of two mats (or lips of mats) may be achieve by forcing the mats together based on the geometry of the structure of the rotor 302. In some embodiments, and as shown, the rotor head 308 and the rotor foot 310 include inclined/angled surfaces 316, which upon rotation of rotor 302 force the mats together by applying a force or compression in a generally inward direction. For example, when compressing two mats together, the rotor head 308 may apply a compressive force in a direction along the longitudinal axis 312 toward the rotor foot 310 and the rotor foot 310 will apply a compressive force in a direction along the longitudinal axis 312 toward the rotor head 308.

The pin body 304 is shaped to substantially fill pin apertures in overlaid mats (e.g., in or along a mat lip), in order to effectively serve as a bushing for the rotor 302 during the locking process. In the illustrative configuration, the pin body 304 includes pin projections 318. The pin projections 318 may be provided at one end or side of the pin body 304 (e.g., an upper end or top of the bin body 304), to provide an interference with the material of the mat that surrounds and defines the pin aperture into which the pin body 304 is inserted. The pin projections 318 may prevent the locking pin 300 from passing through the pin apertures of the mat(s). The pin body 304 may have a shape, size, and geometry which prevents the pin body 304 from rotating in the pin apertures when inserted therein. That is, the pin body 304 may have a generally oblong cross-sectional shape such that the pin body 304 has a long axis 320 and short axis 322 (shown in FIG. 3D). As shown in FIG. 3D, the pin body 304 has a generally rounded-corner, rectangular cross sectional shape. It is to be understood that other cross sectional shapes are possible, such as, without limitation, oval, racetrack, squared, rectangular, or any other suitable shape that reasonably conforms to the pin aperture shape and is arranged such that the pin body 304 cannot rotate relative to the mats (e.g., pin aperture) when installed therein.

The rotor 304 and the pin body 306 may be formed of various materials. For example, one or both of the rotor 304 and the pin body 306 may be formed of a respective metallic core that is molded over by a plastic composite. The plastic composite that provides the bulk of the structure and shape of the rotor 304 and the pin body 306 may include fiberglass embedded or incorporated into the plastic material to provide additional structural and mechanical properties to the locking pin 300. Examples of a locking pin that may be employed with embodiments of the present disclosure are described in U.S. Pat. No. 6,722,831, entitled "Fastening Device," the contents of which are incorporated in their entireties to this disclosure.

Embodiments of the present disclosure are directed to improved surface properties for mats, such as those shown and described above. For example, in accordance with some embodiments, a surface layer of the mats may be modified to have increased friction as compared to prior mat configurations and compositions. In some embodiments, the increased friction may be provided by an added top layer and/or material added to a top surface layer of the mat. In accordance with some embodiments, a friction layer (e.g., top layer of a mat) may be formed from or include recycled materials. In some such embodiments, the recycled material may be provided from recycled locking pins.

Figure 4A:
FIG. 4A is a schematic illustration of a step of a manufacturing process for making a mat in accordance with an embodiment of the present disclosure.
Figure 4B:
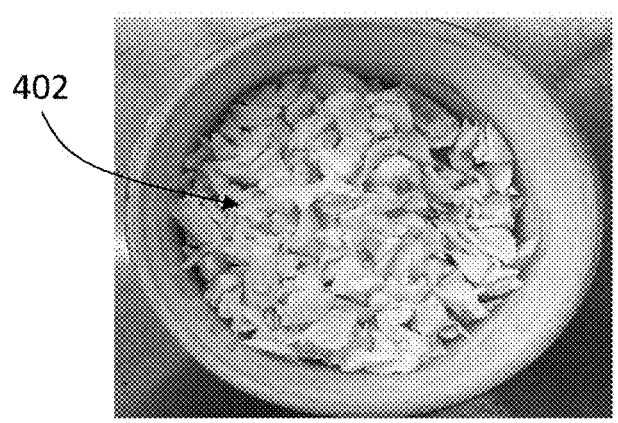
FIG. 4B is a schematic illustration of recycled material that may be used to form a friction layer of a mat in accordance with an embodiment of the present disclosure.
Figure 4C:
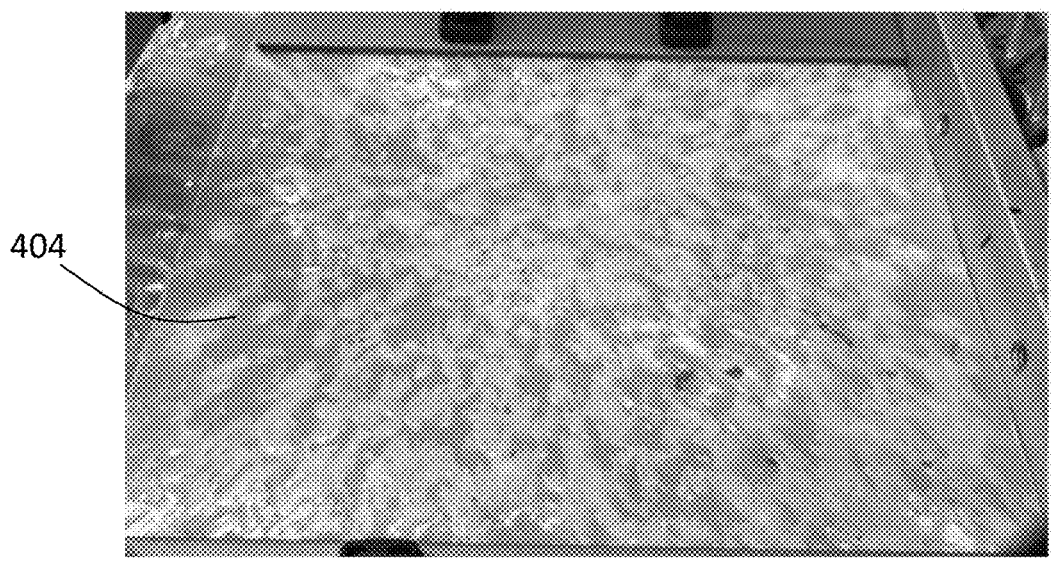
FIG. 4C is a schematic illustration of a part of a manufacturing process of making a mat having a friction layer in accordance with an embodiment of the present disclosure.

Referring now to FIGS. 4A-4C, illustrations of process for forming a mat 400 having a friction layer 404 formed at least partially from recycled material 402 are show. FIG. 4A illustrates an almost complete mat, having a structure such as that shown and described above (e.g., as shown in FIGS. 1A-B and FIG. 2). In FIG. 4A, the mat 400 may have a substantially smooth top surface layer. FIG. 4B illustrates particulate recycled material 402. The recycled material 402 can be sourced from locking pins or other plastic composite material. For example, the metallic cores of locking pin structures (e.g., rotors and/or pin bodies) can be removed and the plastic composite material then crushed and separated into the particular material illustrated in FIG. 4B. The recycled material 402 may then be distributed over the top surface of the mat 400 (FIG. 4A) and may be pressure and/or temperature treated to embed/or and integrate the recycled material 402 as the friction layer 404 to define a top surface of the mat 400.

Figure 5:
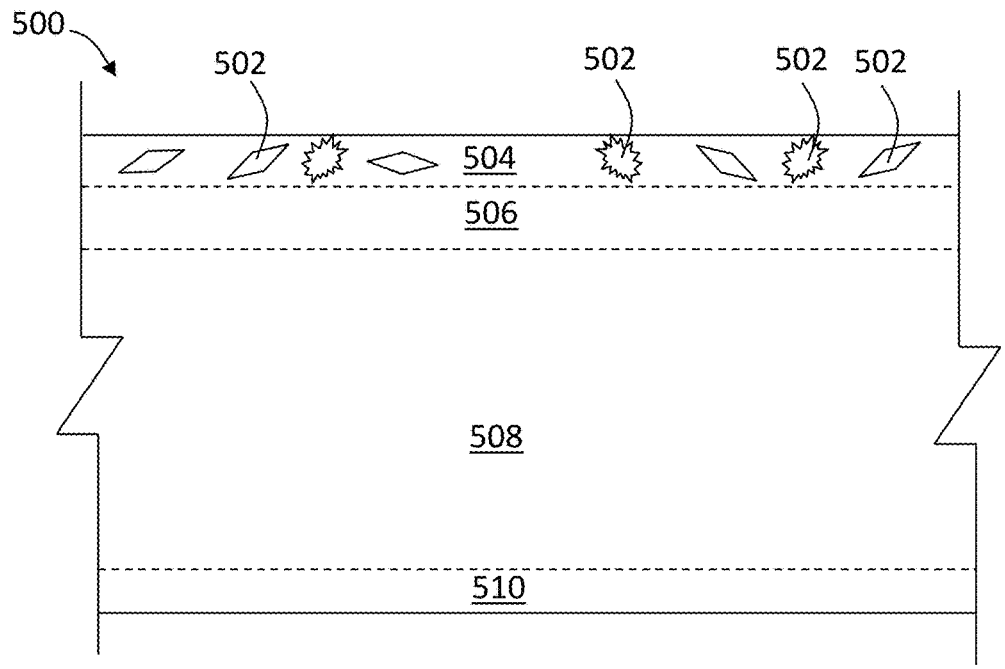
FIG. 5 is a schematic illustration of a portion of a mat in accordance with an embodiment of the present disclosure.

FIG. 5 illustrates a cross-sectional view of a portion of a mat 500 in accordance with an embodiment of the present disclosure. The mat 500 includes a friction layer 504 applied thereto, in accordance with a first non-limiting example configuration. The mat 500 includes the friction layer 504, an intermediate top layer 506, a support layer 508, and a base layer 510. The intermediate top layer 506 and the base layer 510 are both solid layers and the support layer 508 is a layer having three-dimensional structure (e.g., interior support structure 208 shown in FIG. 2). As such, the support layer 508 may include walls and voids arranged in a patterned structure that provides structural stability to the mat 500 while minimizing weight by inclusion of the voids of the support layer 508. The friction layer 504 is provided as a distinct or separate layer on top of the intermediate top layer 506 and includes the recycled material 502 embedded or integrated therein. The embedded recycled material 502 provides for increased friction on the top of the mat (e.g., a top contact or exposed surface of the mat 500). For example, the increase in friction may be achieved due to the embedded recycled material 502 increasing a coefficient of friction at the surface of the mat 500. Further, for example, the increase in friction may be achieved through an increase is roughness provided by the embedded recycled material 502 and/or a material/chemical increase in the coefficient of friction of the top surface layer of the mat 500. Such increase in friction may be achieved by an increase in the friction coefficient, which may be increased, for example and without limitation, by 15% or more as compared to a non-treated mat surface.

The recycled material 502 may be particulate material, such as, and without limitation, grit, plastic, fiberglass, silica, sand, metal dust, wood dust, or the like. The distribution of the recycled material 502 within the friction layer 504 may be random or intentional (e.g., even distribution). Further, the orientation of the particles may be random or may be structural and oriented, depending on the nature of the recycled material 502. It will be appreciated that the illustration of FIG. 5 (and FIG. 6) are not to scale and should not be limiting with respect to number, location, density, distribution, relative sizes, or the like.

Figure 6:
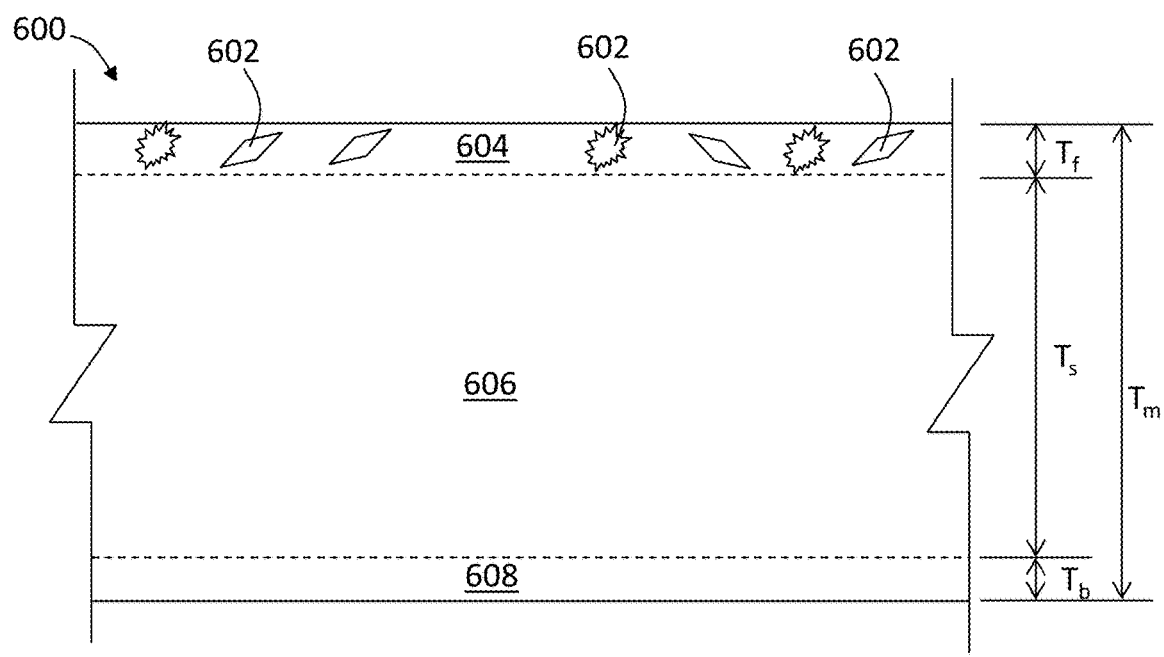
FIG. 6 is a schematic illustration of a portion of a mat in accordance with an embodiment of the present disclosure.

FIG. 6 illustrates a cross-sectional view of a portion of a mat 600 in accordance with an embodiment of the present disclosure. The mat 600 includes a friction layer 604 applied thereto, in accordance with a first non-limiting example configuration. The mat 600 includes the friction layer 604, a support layer 606, and a base layer 608. In this configuration, an intermediate top layer is omitted. As such, in this configuration, the friction layer 604 and the base layer 608 define the solid layers and the support layer 606 is a layer having three-dimensional structure (e.g., interior support structure 208 shown in FIG. 2). The support layer 608 may include walls and voids arranged in a patterned structure that provides structural stability to the mat 600 while minimizing weight by inclusion of the voids of the support layer 608. The friction layer 604 defines the top-most layer of the mat 600 and includes recycled material 602 embedded or integrated therein. The embedded recycled material 602 provides for increased friction on the top of the mat (e.g., a top contact or exposed surface of the mat 500). In this configuration, the friction layer 604 defines a top solid surface or layer relative to the internal voids of the support layer 606.

In accordance with embodiments of the present disclosure, the base layers (510, 608) and/or the support layers (508, 606) may be formed from a first material. The intermediate top layer (506) may be formed from a second material that is different from the first material. For example, the first material and the second material may be formed from different materials or combinations of materials. In one non-limiting example, the first and second materials may both be polyethylene mixtures, but the mixture percentages and/or the specific materials incorporated into the polyethylene mixtures may be different between the two materials.

Further, in some embodiments, the friction layer (504, 604) may be formed of the same first material and also includes embedded recycled material (e.g., particulate material as described above). In other embodiments, the friction layer (504) may be formed from the second material (e.g., of the intermediate top layer 506) and include embedded recycled material. In still further embodiments, each layer may be formed from a separate or different material or mixtures of materials. As such, the specific material composition of the various layers is not intended to be limiting, but rather provides a basis for different types of mats having desired properties to be manufactured while providing the frictional and other benefits described herein.

The recycled material that is integrated into the friction layer of mats in accordance with embodiments of the present disclosure may be sourced from various sources. As noted above, the recycled material may be sourced from recycled locking pins that are used with the mats. The recycled locking pins may be locking pins that have been previously used. For example, when locking pins are damaged during use (e.g., tread upon, cut into, or the like), the locking pins may no longer be operable to connect or join mats together. Rather than discarding such damaged locking pins, the locking pins may be recycled and used to form the friction layers described herein. The metallic components of the locking pins may be recycled and used to form new locking pins, if not damaged, or may be otherwise recycled.

The recycled material used to form the friction layer is a particulate material that can be integrated into material of the mat to define the top friction layer. The material of the mat (including the material into which the recycled material is incorporated) may be constructed of a thermoplastic polymeric material, such as polyethylene or alkathene. In one or more embodiments, the mat material can be made of high-density polyethylene, medium-density polyethylene, low-density polyethylene, or mixtures thereof. In accordance with embodiments of the present disclosure, the material used to form the mat material (not just the friction layer) may be a combination of recycled and new material, with the recycled material being the same as that for the friction layer or sourced from other sources and having different properties.

Mats are conventionally made through a manufacturing process of pouring or otherwise depositing a material (e.g., beads of material) into a mold, and then applying heat and pressure to form the mat from the poured material. One such manufacturing process is described in U.S. Pat. No. 6,649,110, entitled "Method for manufacturing molded panels," which is hereby incorporated by reference in its entirety. The poured material may be a resin in melted or liquid state, or in a solid pellet or granule form. In accordance with embodiments of the present disclosure, the poured material may be a combination of recycled material and new, unused, or virgin material. The recycled material may be combined with the new material through an extrusion process or the like and then melted or compressed into the shape and form of the mat. In accordance with embodiments of the present disclosure, prior to the pressure and/or heat application, the recycled material may be distributed over the top surface of the mat such that application of the heat and/or pressure causes the recycled material to be integrated, incorporated, or otherwise embedded within the material of the mat.

In accordance with embodiments of the present disclosure, in both configurations described above (e.g., FIGS. 5-6), the friction layer may have a thickness relative to a total thickness of the mat. Referring again to FIG. 6, the mat 600 has a total thickness indicated as mat thickness $T_m$. The layers 604, 606, 608 have a combined thickness equal to the mat thickness $T_m$. The friction layer 604 has a friction layer thickness $T_f$, the support layer 606 has a support layer thickness $T_s$, and the base layer 608 has a base layer thickness $T_b$ ($T_m = T_f + T_s + T_b$). In some non-limiting embodiments, the friction layer 604 (whether as a separate layer (FIG. 5) or the sole top layer (FIG. 6)) may have a thickness of 5% or less of the total thickness of the mat 600 (e.g., $T_f \leq 0.05 * T_m$). In some embodiments, the friction layer thickness $T_f$ may be 2% or less than the mat thickness $T_m$. In some embodiments, in combination with a thickness or alternatively thereto, the size of the friction layer 604 may be based on a total weight of the mat 600. For example, in some non-limiting embodiments, the friction layer 604 may comprises 5% or less of the total weight of the mat 600 (combination of embedded recycled material 602 and the material in which it is embedded).

The particles of the recycled material may be of a desired size to ensure desired friction characteristics in the formed mat. In some embodiments, the particle size of the recycled material may be 10 microns or larger and may be 0.5 cm or less (e.g., between 0.001 cm and 0.5 cm). The recycled material, in accordance with embodiments of the present disclosure, is incorporated into the mats to provide improved friction on the top surface of the mat. As such, in accordance with some embodiments, the recycled material may include fiberglass, gritty substances (e.g., dirt, sand, etc.), or the like, that is molded into the friction layer of the mat. Because the recycled material is a particulate when applied, the manufacturing process may comprise depositing resin pellets (mat material), depositing the recycled material on top of the resin pellets, and then applying heat and pressure to form the mat. During the application of the heat and pressure, the deposited recycled material will fuse with the mat (resin) material to form a combined structure (i.e., a formed mat having a friction layer). That is, the recycled material and the resin material are fused together during the treatment by at least one of the heat treating and the pressure treating to form a friction layer of the formed mat comprising the fused resin material and recycled material.

The friction layer increases friction of the mat through a combination of chemical response (e.g., inherent tack) and mechanical roughness. The recycled material may include hard particles such as grit, plastic, fiberglass, silica, sand, metal dust, wood dust, or the like (e.g., fine particulate substances/materials). The hard particles may be selected to have a melting temperature that is greater than a melting temperature of the mat material (e.g., the resin pellets). As such, during application of heat and pressure, the mat material will melt and fuse the hard particles into the material (e.g., embed). In some embodiments, the hard particles may be non-polymeric. In some embodiments, the hard particles may have a melting temperature that is 200° C. or greater than the melting temperature of the mat materials. In the formed mat, having a friction surface, the hard particle density may be 1.5 g/cc.

In a comparison between a conventional mat (no friction surface as described herein) and a mat having a friction layer, the mat with a friction layer has increased frictional properties. For example, in an incline test, the mat with a friction layer may have an improved frictional property of 15% or greater with respect to the tire and an improved frictional property of over 100% with respect to the metal sled. For example, in one non-limiting example, using a tire weighing 2.6 kg and a metal sled having a weight of 6.6 kg, the conventional mat may have a mean angle of 24.436 and a static coefficient of 0.45450 for the tire and a mean angle of 6.5160 and a static coefficient of 0.11422 for the metal sled. In contrast, the mat having a friction layer as described herein has a mean angle of 29.487 and a static coefficient of 0.56618 for the tire and a mean angle of 15.216 and a static coefficient of 0.27216 for the metal sled.

Advantageously, embodiments of the present disclosure provide for improved friction surfaces of mats used for support surfaces. By incorporating particulate material into atop layer or surface of the mats, the frictional properties thereof may be improved. In some embodiments, the particulate material may be sourced from recycled materials, such as recycled locking pins that are used with the mats. Various types of hard particles may be used to improve the frictional properties of the mat, such as fiberglass, grit, dirt, sand, metallic particles, wood particles, high-temperature plastic materials (e.g., having high melting point than rest of mat material), or the like. These hard particles provide increase frictional properties when incorporated into the mats.

Although the above examples are provided, those of skill in the art will appreciate that other materials, compositions, and/or blends may be employed without departing from the scope of the present disclosure. That is, the above examples are merely for explanatory and illustrative purposes and are not intended to be limiting on the scope of the present application.

As used herein, the terms "about" and "substantially" are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an illustrative embodiment or embodiments, it will be understood by those skilled in the art that various changes may be made, and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of manufacturing a mat for use as a support surface, the method comprising:
    separating metallic cores from plastic composite material of used locking pins which were previously used for securing mats together;
    grinding the plastic composite material of the used pins to generate recycled material;
    depositing a resin material in a mold shaped to define a mat;
    depositing the recycled material on a top surface of the deposited resin material; and
    at least one of heat treating and pressure treating the resin material and the recycled material to generate a formed mat,
    wherein the recycled material and the resin material are fused together during the treatment by at least one of the heat treating and the pressure treating to form a friction layer of the formed mat comprising the fused resin material and recycled material.

2. The method of claim 1, wherein the recycled material comprises particulate material comprising at least one of grit, plastic, fiberglass, silica, sand, metal dust, and wood dust.

3. The method of claim 1, wherein the recycled material comprises a material having a melting temperature greater than a melting temperature of the resin material.

4. The method of claim 3, wherein the melting temperature of the recycled material is 200° C. or greater than the melting temperature of the resin material.

5. The method of claim 1, wherein the recycled material comprises particles having a size that is 3 microns or larger and 0.5 cm or less.

6. The method of claim 1, wherein the friction layer has a thickness of 5% or less of a total thickness of the formed mat.

7. The method of claim 6, wherein the friction layer has a thickness of 2% or less of the total thickness of the formed mat.

8. The method of claim 1, wherein the friction layer comprises 5% or less of a total weight of the formed mat.

9. The method of claim 1, wherein the resin material comprises a high-density polyethylene, medium-density polyethylene, low-density polyethylene, or mixtures thereof.

10. The method of claim 1, wherein the formed mat comprises the friction layer, a support layer, and a base layer.

11. The method of claim 10, further comprising an intermediate top layer arranged between the friction layer and the support layer, wherein the intermediate top layer is formed from the resin material.

12. The method of claim 10, wherein the support layer comprises walls and voids arranged in a patterned structure between the friction layer and the base layer.

* * * * *